United States Patent [19]
Ramacciotti

[11] 3,873,652
[45] Mar. 25, 1975

[54] PROCESS FOR RESTORING THE THICKNESS AND/OR THE INTEGRITY OF THE INNER REFRACTORY LINING OF A ROTARY REACTOR

[75] Inventor: Aldo Ramacciotti, Rome, Italy

[73] Assignee: Centro Sperimentale Metallurgico S.p.A., Rome, Italy

[22] Filed: Apr. 25, 1972

[21] Appl. No.: 247,362

[30] Foreign Application Priority Data
May 27, 1971 Italy.................................. 50638/71

[52] U.S. Cl...................... 264/30, 264/57, 264/270
[51] Int. Cl.............................................. F27d 1/16
[58] Field of Search ....... 264/30, 36, 269, 270, 309, 264/57

[56] References Cited
UNITED STATES PATENTS
| | | | |
|---|---|---|---|
| 1,510,117 | 9/1924 | Von Vass....................... | 264/309 X |
| 3,518,330 | 6/1970 | Demaison............................ | 264/30 |
| 3,663,669 | 5/1972 | McConnell........................... | 264/30 |

*Primary Examiner*—Robert F. White
*Assistant Examiner*—Thomas P. Pavelko
*Attorney, Agent, or Firm*—Young & Thompson

[57] ABSTRACT

A process for restoring the thickness and/or the integrity of the refractory lining of the walls of reactors while rotating about their substantially vertical geometrical axes, comprising a step of laying the material suitable for the repair, dried and in granular form, projected against the zones where the repair is necessary, and a step of sintering the laid material on the zone interested to the repair due to the heat developed inside the reactor, wherein the projection of said material to be laid will be effected at a speed whose representative vector lies in a horizontal plane, said vector being as much as possible coincident as to its direction, sense and magnitude, with the vector representing the linear peripheral speed of the reactor at the point of impact of the grains of the repair material onto the walls of the reactor, the values of said speeds being selected as to ensure the adhesion of the grains to the wall of the reactor due to the centrifugal force and the friction.

4 Claims, 1 Drawing Figure

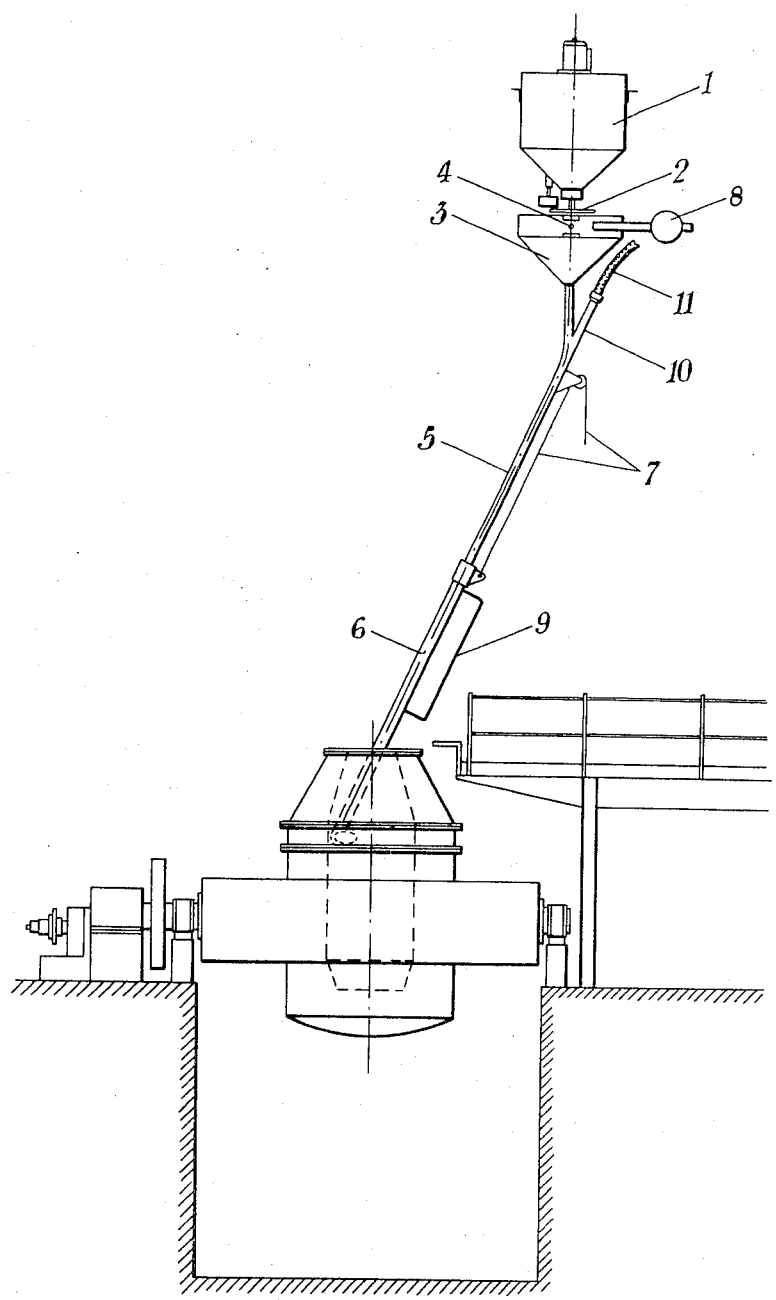

3,873,652

PROCESS FOR RESTORING THE THICKNESS AND/OR THE INTEGRITY OF THE INNER REFRACTORY LINING OF A ROTARY REACTOR

The present invention relates to a process for restoring the thickness and/or the integrity of the refractory lining of the inner surface of reactors while rotating about their substantially vertical geometrical axes. More precisely, this invention relates to a process and to a device for carrying out the operations for restoring the thickness and/or the integrity of the lining, avoiding, in the most general case, the interruptions of operation and the cooling of the reactor itself.

It is known that the technical problem of restoring the integrity and/or the thickness of the refractory lining of furnaces or reactors for metallurgical processes has been solved in the past by means of devices capable of projecting against the walls, at the points where the repair becomes necessary, a suitable material, in the form of slurry in order to ease its adhesion to the walls themselves.

The most important inconveniences connected with the use of this technique are due to the impossibility of avoiding the fall of material, the greater being said fall the closer to the vertical being the inclination of the walls. In fact the impossibility of avoiding the fall of the material determines inconveniences of a double nature. In fact, not only in the most severe cases the repair does not occur at all, but the process taking place in the reactor can even be adversely affected by the presence of refractory material in the slag.

The purpose of the present invention is that of preventing the aforesaid inconveniences by supplying a repair process for the lining of a rotary reactor which, by means of a dispenser, suitably embodied and oriented, will avoid the rebound of refractory particles to be deposited on the zone to be repaired and which, by selecting a suitable speed of rotation of the reactor, will ensure the adhesion of the particles to the wall owing to the centrifugal force and the friction, before said particles are finally fixed to the wall itself.

Said purpose will be attained according to the present invention, by using said device in a process consisting of two stages: a first stage of deposit on the reactor walls of the repair material in a granular state, and a second stage, of cohesion of said granules with one another as well as of their adhesion to the wall, said stage being hereinafter called "sintering stage." Said sintering stage is caused by the heat developed by the reaction carried out in the reactor or by the combustion of a fuel suitably introduced into the reactor.

Having thus disclosed the purposes of the present invention, more detailed information will now be supplied about the operation and the structure of the single parts of the dispenser for the material to be deposited, and about the operations forming the process including the stage of deposit and that of sintering of the material deposited in the zone where the repair was necessary.

With reference to FIG. 1 showing an (exemplary and not limitative) side view of the device in operation, said delivery equipment consists of:

A stationary hopper 1 for storing the material to be deposited provided with a rotary-disc feeder 2 and associated fittings which allow the hopper to be emptied with an adjustable rate;

a collecting hopper 3, supported by means of the pins 4 and therefore free to oscillate, located under the feeder and wherefrom the material to be deposited, in form of grains, will be conveyed into an acceleration duct having substantially vertical arrangement;

an acceleration duct having a substantially vertical arrangement, consisting of a stationary portion 5 which reaches the collecting hopper 3 and of a dispenser proper 6, telescopically slidable on the stationary portion, and with its final part bent so as to be located on a horizontal plane (in the operative stage) and provided with a handle 9. The weight of the dispenser is balanced by a balancing member, not shown in the figure to which it is connected by a rope 7;

a counterweight 8, the position of which can be adjusted on the arm fixed to the collecting hopper, capable of controlling the angular location of the oscillating system consisting of the collecting hopper and of the two portions of the acceleration duct;

a tubular arm 10 obtained on the stationary portion 5 of the acceleration duct and to which leads the flexible duct 11 for the connection to a gas distribution network, facilitating the flow of the repair material in the acceleration duct and of modifying, within certain limits, its speed, by the admission into the duct itself of a gaseous stream.

The deposit of the material will take place on the internal surface of the reactor in the interested zone so that, calling $\vec{V}_g$ the representative vector of the discharge speed of the grains of the material to be deposited from the dispenser (said vector lying on a horizontal plane), $\vec{V}_p$ the vector representing the peripheral speed of the reactor at the impact point of the grains of the material to be deposited, and $\alpha$ the angle comprised between the direction of the vector $\vec{V}_g$ and the direction of the vector $\vec{V}_p$, said angle will be as near as possible to zero. Thus, in fact, the component of the vector $\vec{V}_g$ along the direction of the vector $\vec{V}_p$ will take values very close to the vector $\vec{V}_g$ itself.

In fact, as is known, said component is $V_g \cos\alpha$, whereby the more $\alpha$ is near to zero, the more the value of $\cos\alpha$ is near to one. Furthermore, the two vectors $\vec{V}_g$ and $\vec{V}_p$ must have their magnitude as much as possible coincident so that the relative speed of the grains with respect to the wall of the reactor will be nil.

Consequently, as the deposit of said grains occurs at a speed almost nil, the rebound losses of the material to be deposited on the reactors walls will be avoided.

The above conditions, however, even if necessary and sufficient in order to ensure the elimination of the rebound losses of the material to be deposited on the walls of the reactor, are necessary but not sufficient to ensure the adhesion of the material on the walls. To obtain an equilibrium condition, the following conditions must be verified simultaneously:

the component $F_n$ (perpendicular to the wall of the reactor) of the centrifugal force must be greater than the component $P_n$ (perpendicular to the reactor wall) of the weight force of the single particles.

In symbols:

$$F_n \geq P_n$$

The friction resistance along the reactor wall $R_a$ must be greater than the sum of the component $F_p$ (along the wall) of the centrifugal force and of the component $P_p$ (along the same wall) of the weight force of the single particles. In symbols:

$$R_a \geq F_p + P_p$$

Said conditions are satisfied according to the process forming the object of the present invention when, being: $\beta$ the angle formed between the reactor wall and the vertical, $g$ the gravity acceleration; $r$ the radius of the circumference of the cross section of the reactor at the point of impact of the grains of the material to be deposited, and $f$ the friction coefficient of the grains themselves, the previously defined speed $V_p$ is so selected that simultaneously be valid the two relations:

$$\tan \beta \leq V_p^2/(g \cdot r)$$
$$f \geq [(V_p^2/r) \tan \beta + g]/[(V_p^2/r) - g \tan \beta],$$

$\beta$ being comprised between 0° and 35°.
In other words, the peripheral speed is a function of $\beta$, $f$ and $r$.

For a given reactor having a determined internal profile for its lining, in correspondence with each point of the profile itself, to which correspond determined values of $\beta$ and of $r$, and assuming established $f$ as the consequence of a pre-determined grain size of the material, we shall have a determined peripheral velocity satisfying said dynamic equilibrium condition. Practically, in case of a process for refining the pig iron where $r$ has values comprised between 1 and 4 metres and $\beta$ between 0° and 35°, said peripheral speed will take values comprised between 100 and 400 metres slash minute to which correspond, for the afore-said interval of values $r$, minimum angular speeds of the reactor comprised between 4 and 100 r.p.m.

The material which in said conditions will adhere to the walls of the reactor, at the point where the deposit is necessary, will be fixed to the wall by sintering. The sintering occurs due to the heat developed, inside the reactor, by a suitable source, said source being different according to the repair of the refractory being carried out either during the operation or after the operation of the reactor has been discontinued.

In order to clarify the foregoing, reference is made to the case in which the process occurring in the vertically rotating reactor is the conversion of liquid pig iron into steel by oxygen top blowing through a lance. Under these conditions as is known, due to the rotation of the reactor, the liquid pig iron rises along the walls of the reactor, and the free surface of the bath takes the shape of a paraboloid of revolution. Owing to the rise of the liquid pig iron along the walls, the thermal protection of the refractory under the liquid pig iron is better than that of the refractory left uncovered. Obviously, in this case the deposit of new refractory material will be more frequently necessary on the parts of lining remaining uncovered during the metallurgical operations. Thus, the repair according to the process of the present invention can be made avoiding the shut-down of the reactor operation whereas the sintering heat will be supplied by the refining reaction itself of the pig iron with the top blown oxygen.

If however, in the less frequent case, it is necessary to supply the repair material in a zone normally covered by the liquid pig iron or generally by the charged material, the shutdown of the operation cannot be avoided. In that case, after having carried out, in the empty converter, the supply of coating material as previously described, its sintering will be obtained by combustion of liquid, solid, or gaseous fuels through an oxygen-blowing lance or a burner introduced into the converter through its mouth.

The repair material can be of refractory nature (for instance: Ca, Mg, Si, Zr, Al oxides) or Ca, Mg, Si, Zr, Al carbonates, etc., or more generally of any nature providing they are fit to repair the lining, compatible with it and with the process occurring in the reactor. Said material must be previously dried and if necessary reduced by grinding or sieving to a grain size not above 2 mm. Said grains of repair material can be coated with a layer of tarry or bituminous material or other material adapted to increase their adhesion to the walls.

It is to be pointed out that the device and the process according to the present invention, are usefully usable not only in case of repair of reactors rotating their operation, but also in whatsoever type of reactors provided with suitable devices allowing their rotation in vertical position for carrying out said stage of repair.

In order to better clarify the principles and the method of carrying out this invention an example of practical embodiment will be now disclosed.

EXAMPLE (Converter in rotation; $r = 1$ meter)

A part of the cylindrical wall is to be lined with a protective layer of limestone having the thickness of 0.5 cm. The surface to be coated is the area uncovered by the melt during the rotation, the angle $\beta$ having the value zero.

The repair will be carried out in the reactor after the charge has been made, as follows:
The reactor is made to revolve at 60 r.p.m., corresponding to a linear peripheral speed of
$(2 \pi r \cdot 60)/60 = 6.26$ m/sec.
as $\beta = 0$, from the relation
$$f \geq [(V_p^2/r) \tan \beta + g]/[(V_p^2/r) - g \tan \beta]$$
It will be obtained that the condition of adherence is satisfied for values $f \geq 0.25$. As the friction coefficient of the limestone, the grains of which have sizes below 2mm, is about 0.9, the condition of adherence will be satisfied.

By making the reactor to rotate the same speed of 60 r.p.m. it is possible to line also other zones of the wall of the reactor where the angle $\beta$ is greater than 0°, using limestone having the same grain size. The maximum value that in this case ($V_p = 60$ r.p.m.) can be taken by $\beta$ in these conditions of dimensions of grains, will be calculated as follows:
$$0.9 = [(6.28^2/1) \tan \beta + 9.8]/[(6.28^2/1) - 9.8 \tan \beta]$$
wherefrom we shall obtain $\tan \beta = 0.53$, i.e., $\beta = 28°$.

In order that the lining material reaches the wall of the reactor from the nozzle of the dispenser with the speed of 6.28 m/sec, assuming it arrives under free fall, the height of fall can be calculated in the ground of the relation $\sqrt{2gh} = 6.28$, i.e.
$$h = (6.28^2/2g) \approx 2 \text{ m}.$$
In order to take account of the friction that the grains meet during their flow inside the whole delivery device, the above value must be suitably increased, for instance up to 3 metres. Then the sintering of the lining material occurs as described.

The present invention has been illustrated and described in one preferred embodiment, being however understood that non essential changes might be practically adopted without departing from the scope of the present industrial privilege.

Having thus described the present invention, what is claimed is:

1. A process for restoring the thickness and/or the integrity of the refractory lining of the walls of a reactor having a substantially vertical geometrical axis, comprising the steps of rotating the reactor about said axis, simultaneously projecting finely divided dry repair material against the regions of the inner surface of the refractory lining where repair is necessary while maintaining the following two relationships:

$$\tan \beta \leq V_p^2/(g \cdot r)$$
$$f \geq [(V_p^2/r) \tan \beta + g]/[(V_p^2/r) - g \tan \beta],$$

and in which $\beta$ is the angle of inclination of the surface of the internal wall of the reactor with respect to the vertical and is comprised between 0° and 35°, $g$ is the acceleration of gravity, $r$ is the radius of the inner wall of the reactor against which the repair material is projected, $f$ is the coefficient of friction between the grains and the lining surface, and $V_p$ is the peripheral speed of the reactor at the point of impact of the repair material against the lining surface, said repair material and said lining surface having substantially the same tangential velocity as each other in the direction of rotation of said reactor in a plane perpendicular to the axis of said reactor at the point of impact of said repair material and said wall, whereby the difference in velocity of said repair material and said inner surface is substantially zero, and then heating the lining to sinter the repair material thereto while continuing the rotation of the reactor about said axis.

2. A process as claimed in claim 1, in which the peripheral speed of said lining surface is between 100 and 400 meters per minute and the internal diameter of the reactor is between 2 and 8 meters.

3. A process as claimed in claim 1, in which said repair material has a particle size no greater than 2 millimeters.

4. A process as claimed in claim 1, in which said repair material is selected from the group consisting of oxides and carbonates of calcium, magnesium, silicon zirconium and aluminum.

* * * * *